US007025246B2

(12) United States Patent
Wild et al.

(10) Patent No.: US 7,025,246 B2
(45) Date of Patent: Apr. 11, 2006

(54) COAXIAL CABLE WITH ANGLE CONNECTOR, AND METHOD OF MAKING A COAXIAL CABLE WITH SUCH AN ANGLE CONNECTOR

(75) Inventors: Werner Wild, Butterwiesen-Untertürheim (DE); Peter Böhmer, Aue (DE)

(73) Assignee: Spinner GmbH, Munich (DE)

( * ) Notice: Subject to any disclaimer, the term of this patent is extended or adjusted under 35 U.S.C. 154(b) by 221 days.

(21) Appl. No.: 10/712,508

(22) Filed: Nov. 13, 2003

(65) Prior Publication Data

US 2004/0094605 A1 May 20, 2004

(30) Foreign Application Priority Data

Nov. 16, 2002 (DE) ................................ 102 53 377

(51) Int. Cl.
*B23K 1/00* (2006.01)

(52) U.S. Cl. ........................ 228/175; 228/148; 29/828; 29/857; 29/860

(58) Field of Classification Search ................ 228/148; 29/828

See application file for complete search history.

(56) References Cited

U.S. PATENT DOCUMENTS

| | | | | |
|---|---|---|---|---|
| 5,283,082 | A * | 2/1994 | Hussmann et al. | 427/118 |
| 6,017,242 | A * | 1/2000 | Kerrigan | 439/445 |
| 6,281,856 | B1 * | 8/2001 | Tang et al. | 343/790 |
| 6,860,761 | B1 * | 3/2005 | Lee et al. | 439/582 |
| 6,915,564 | B1 * | 7/2005 | Adams | 29/828 |
| 2005/0159043 | A1 * | 7/2005 | Harwath et al. | 439/578 |

FOREIGN PATENT DOCUMENTS

| | | |
|---|---|---|
| DE | 71 28 030 U | 10/1971 |
| DE | 25 10 170 C3 | 9/1976 |
| DE | 38 36 141 A1 | 4/1990 |
| DE | 198 54 503 C1 | 5/2001 |

* cited by examiner

*Primary Examiner*—Jonathan Johnson
(74) *Attorney, Agent, or Firm*—Henry M. Feiereisen

(57) ABSTRACT

A coaxial cable structure includes an outer cable conductor, and an angle connector, for example a 90° elbow connector, disposed on one cable end. The elbow connector is implemented by encapsulating the one cable end with thermoplastic material and including a metal sleeve which is placed in contact with the outer cable conductor to define an outer conductor of the elbow connector.

6 Claims, 2 Drawing Sheets

COAXIAL CABLE WITH ANGLE CONNECTOR, AND METHOD OF MAKING A COAXIAL CABLE WITH SUCH AN ANGLE CONNECTOR

CROSS-REFERENCES TO RELATED APPLICATIONS

This application claims the priority of German Patent Application, Serial No. 102 53 377.6, filed Nov. 16, 2002, pursuant to 35 U.S.C. 119(a)–(d), the disclosure of which is incorporated herein by reference.

BACKGROUND OF THE INVENTION

The present invention relates to a method for making an angular or elbow connection on the end of a flexible coaxial cable, and to a coaxial cable provided with an angle connector on at least one end.

So-called finished coaxial cables, i.e., cables which are delivered ready-made with a predetermined length and with a connector on both ends are known in the art. Angle connectors, typically 90° elbow connectors, are preferred over straight connectors for installation in confined spaces. The many conventional shapes, such as the exemplary connector described in German Pat. No. DE 198 54 503 C1, have in common that they include at least an inner connector conductor, a support insulator for retaining the inner conductor, and a housing forming the outer connector conductor. The housing includes a connection piece oriented perpendicular to its axis for receiving the cable which can be inserted into the plug end via a multi-part cable clamp and cable seal in the head portion of the connector. This connector head includes an access opening through which the inner cable conductor can be connected, typically soldered, to the inner connector conductor. The opening is subsequently closed off by a threaded cover and the like. Conventional multi-part elbow connectors of this type are the time-consuming to install onto the cable end incur significant manufacturing costs of ready-made coaxial cables.

It would therefore be desirable and advantageous to provide an improved method for making a coaxial with an elbow connection, which obviates prior art shortcomings and is able to significantly reduce manufacturing costs of ready-made coaxial cables.

SUMMARY OF THE INVENTION

According to one aspect of the invention, a method of making an elbow connection on an end of a flexible coaxial cable, includes the steps of preparing a cable end of a coaxial cable by successively trimming away a cable dielectric relative to an inner cable conductor, trimming away an outer cable conductor relative to the cable dielectric, and by trimming away a cable jacket relative to the outer cable conductor, pushing a metal sleeve onto the cable end to form an outer connector conductor, soldering the outer cable conductor to the outer connector conductor, placing the cable end with the outer connector conductor into a cavity of an injection mold having a bend with a predetermined angle, such as a 90° bend, injecting a thermoplastic material into the cavity to form a molded part, and removing the cable end with the attached molded part after a cool-down time.

With this method, conventional elbow connectors can be completely eliminated and the conventional elbow connectors can be replaced with an elbow connector that essentially consists of the angled end of the flexible coaxial cable itself, with the addition of a simple metal sleeve forming the outer conductor of the connector. Suitable for this manufacturing method are in particular coaxial cables with braided outer conductors, preferably with tinned braided outer conductors.

According to another feature of the present invention, the end of the inner conductor of the cable may be conically tapered, as it assumes the function of the plug pin.

According to another feature of the present invention, the end of the coaxial cable can be bent by the predetermined angle, for example by about 90°, before placement into the injection mold.

The metal sleeve forming the outer conductor of the connector is typically pushed onto the end of the coaxial cable together with a connection sleeve held captive on the metal sleeve, before the metal sleeve is soldered to the outer conductor of the cable. The coupling sleeve prevents the connector from being pulled out of the mating connector and can be formed as a coupling nut or in any other manner known in the art.

According to another aspect of the invention, a coaxial cable structure includes a coaxial cable including an outer cable conductor and having two ends, with at least one of the cable ends being bent, and an elbow connector disposed on the one cable end, wherein the elbow connector is implemented by encapsulating the one cable end with thermoplastic material and includes a metal sleeve placed in contact with the outer cable conductor and defining an outer conductor of a connector.

According to another feature of the present invention, the one cable end is bent about a predetermined angle, for example by a 90° angle, wherein the coaxial cable has a cable jacket which is trimmed away at the one cable end, wherein the elbow connector includes a molded part made of thermoplastic material and encapsulating the one cable end through injection molding in such a manner that a short portion of the coaxial cable is exposed beyond the molded part to attach the metal sleeve sufficiently enough for an end of an exposed inner cable conductor to form a plug of the connector and an end of an exposed cable dielectric to form a dielectric of the connector.

According to another feature of the present invention, the inner cable conductor has at the one cable end a conical taper to provide functionality as a plug pin.

According to another feature of the present invention, a coupling sleeve may be disposed on the metal sleeve and held captive by an outside collar of the metal sleeve.

According to another feature of the present invention, the molded part may include at least one reinforcement rib disposed in the plane formed in a plane of the 90° angle of the elbow connector. The reinforcement rib is in particular suitable for applying customary identification marks.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
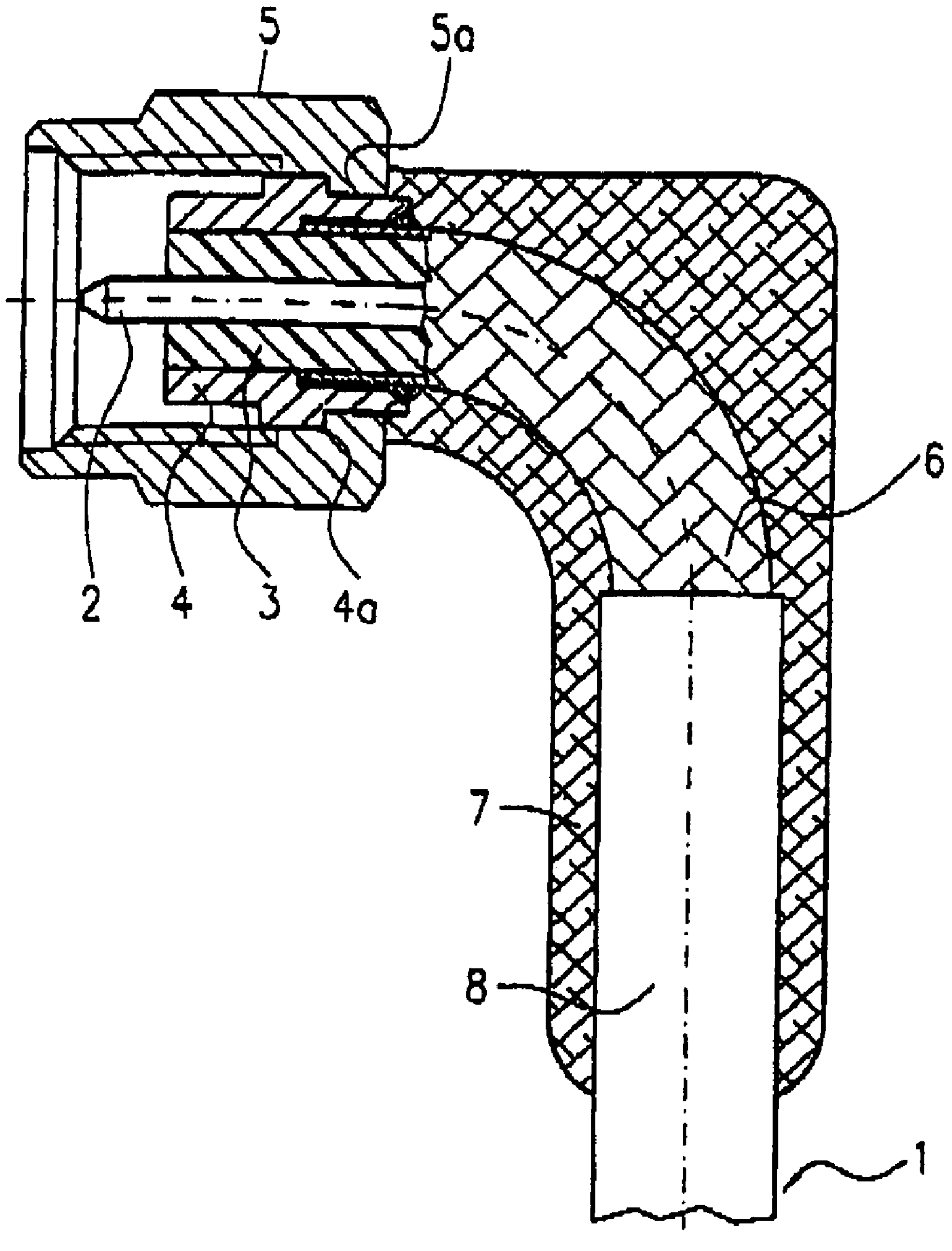
FIG. 1 shows a longitudinal cross-sectional view of an end of a coaxial cable configured as an elbow connector in accordance with the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
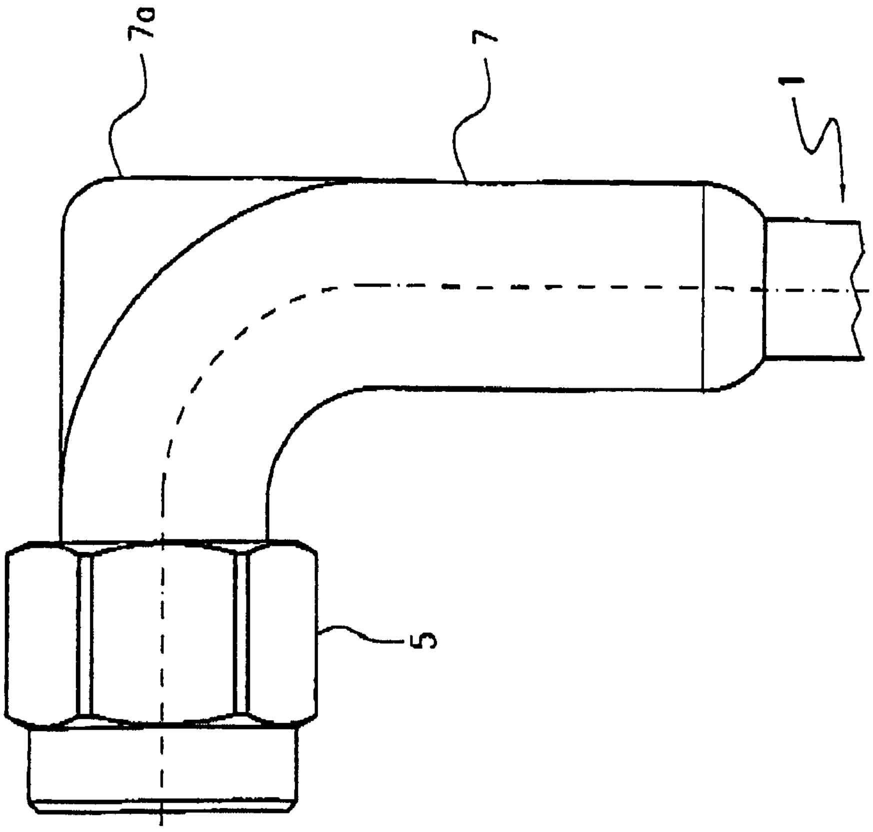
FIG. 2 shows a side view of the cable end.
Figure 3:
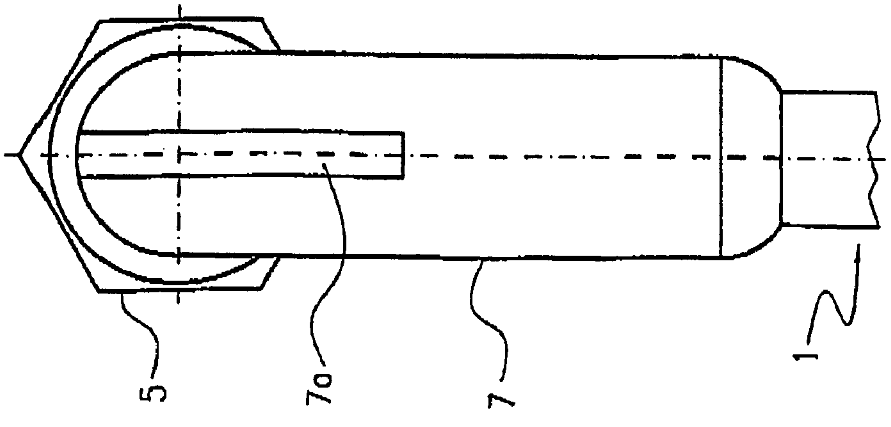
FIG. 3 shows a view of the cable end in the direction of arrow III of FIG. 2.

Turning now to the drawing, and in particular to FIG. 1, there is shown an elbow connector disposed on an end of a cable 1. The elbow connector includes a conically tapered inner conductor 2, which is part of the cable 1 and whose end forms the plug pin, a cable dielectric 3, and a metal sleeve 4, which surrounds the cable dielectric 3 and forms the outer conductor of the connector. The metal sleeve 4 has an outer collar 4*a* which is gripped from behind by an inner collar 5*a* of a coupling nut 5, so that the coupling nut 5 is held captive on the outer conductor 4 of the connector. The metal sleeve 4 has a stepped bore with the greater inside diameter of the side facing the cable 1. The portion of the metal sleeve 4 with the greater inside diameter surrounds a braided outer conductor 6 of the cable 1 and is soldered to the outer cable conductor 6. The outer cable conductor 6 is enclosed by a cable jacket 8 that has been trimmed away by a specified length in dependence on the connector design, so that a bare portion of the outer conductor 6 projects beyond the cable jacket 8 by an appropriate length. The cable 1 then makes an exemplary 90° bend, although the cable can be bent by any other desired angle. In the region of this bend, the cable 1 is extrusion-coated with a thermoplastic plastic material which forms a molded part 7. To provide a seal, the molded part 7 extends a certain distance over the trimmed cable jacket 8. Thus, as shown in FIGS. 2 and 3, the molded part 7 includes a rib 7*a* formed as a single piece which can increase the rigidity and serve as a writing surface.

The elbow connector is advantageously produced by first preparing the cable end by stepwise trimming the cable dielectric 3 in relation to the inner cable conductor 2, by trimming the braided outer conductor 6 relative to the cable dielectric 3, and finally by trimming the cable jacket 8 in relation to the braided outer conductor 6. The inner cable conductor 2 also forms the inner conductor of the connector and projects over the front face of the cable dielectric 3 by a distance defined by an applicable standard for connectors. The inner cable conductor 2 can be suitably tapered, e.g. by using a small cutter, as is customary with conventional connectors.

The metal sleeve 4 forming the outer connector conductor including the coupling sleeve 5 is subsequently pushed onto the cable 1, so that the metal sleeve 4 sufficiently overlaps with the outer cable conductor 6. The end face of the cable dielectric 3 can form a reference plane, so that the end face of the metal sleeve 4 is flush with the end face of the dielectric 3. Next, the metal sleeve 4 is soldered to the outer cable conductor 6 over its entire surface using conventional methods and taking advantage of the capillary effect. The cable end prepared in this manner is then bent in a bending tool about the desired angle, for example, by 90°.

In the following step, the cable end is inserted into the cavity of a conventional injection mold. The cavity is shaped so that the cavity wall facing the end of the cable 1 encloses the cable 1 with a slight radial compressive force whereas the cavity wall facing the end of the connector surrounds the cable-side end of the metal sleeve 4 with a tight fit, thereby realizing an excellent seal.

Subsequently, the molded part 7 is produced by injecting a suitable thermoplastic plastic material. The coaxial cable with the completed elbow connector is removed from the mold after a suitable cool-down time.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of making an angle connector on an end of a flexible coaxial cable, comprising the steps of:

- preparing a cable end of the flexible coaxial cable by successively trimming away a cable dielectric relative to an inner cable conductor, trimming away an outer cable conductor relative to the cable dielectric, and by trimming away a cable jacket relative to the outer cable conductor;
- pushing a metal sleeve onto the prepared cable end to form an outer connector conductor;
- soldering the outer cable conductor to the outer connector conductor;
- placing the cable end with the outer connector conductor into a cavity of an injection mold having bend with a predetermined angle;
- injecting a thermoplastic material into the cavity to form a molded part; and
- removing the cable end with the attached molded part after a cool-down time.

2. The method of claim 1, wherein the angle connector is an elbow connector and the predetermined angle is 90°.

3. The method of claim 1, wherein the end of the inner cable conductor has an end which is conically tapered.

4. The method of claim 1, wherein the cable end is bent by the predetermined angle before insertion into the cavity of the injection mold.

5. The method of claim 1, wherein the predetermined angle is 90°.

6. The method of claim 1, and further comprising the step of providing a captive coupling piece, and pushing the metal sleeve forming the outer connector conductor together with the captive coupling piece onto the cable end.

* * * * *